United States Patent
Katagiri et al.

(10) Patent No.: US 6,808,651 B1
(45) Date of Patent: Oct. 26, 2004

(54) THERMOPLASTIC SHAPED-BODY OF TREHALOSE, PROCESS AND USES THEREOF

(75) Inventors: Naohiko Katagiri, Okayama (JP); Yasuo Takeuchi, Okayama (JP); Michio Kubota, Okayama (JP); Toshio Miyake, Okayama (JP)

(73) Assignee: Kabushiki Kaisha Hayashibara Seibutsu Kagaku Kenkyujo, Okayama (JP)

( * ) Notice: Subject to any disclaimer, the term of this patent is extended or adjusted under 35 U.S.C. 154(b) by 807 days.

(21) Appl. No.: 09/694,677

(22) Filed: Oct. 24, 2000

(30) Foreign Application Priority Data

| Oct. 21, 1999 | (JP) | 11-299575 |
| Feb. 2, 2000 | (JP) | 2000-025100 |
| Mar. 22, 2000 | (JP) | 2000-079236 |
| Jun. 14, 2000 | (JP) | 2000-178424 |

(51) Int. Cl.$^7$ .................. A23L 3/3562; C07H 1/00; C07H 3/06
(52) U.S. Cl. ............. 252/194; 426/443; 426/658; 428/403; 428/543
(58) Field of Search .............. 252/194; 426/443, 426/658; 428/403, 543

(56) References Cited

U.S. PATENT DOCUMENTS 5,510,115 A * 4/1996 Breillatt et al. ............. 424/473
6,187,330 B1 * 2/2001 Wang et al. ................. 424/426

FOREIGN PATENT DOCUMENTS

| EP | 0 628 630 | 12/1994 | |
| EP | 0 690 130 | 1/1996 | |
| JP | 58 216695 | 12/1983 | |
| JP | 170977/95 | 7/1995 | |
| JP | 7 246097/95 | 9/1995 | |
| JP | 11103781 A | * 4/1999 | ............ A23G/3/00 |
| JP | 11299422 A | * 11/1999 | ............ A23G/3/00 |

OTHER PUBLICATIONS

Sugimoto, Chemistry Industry, pp. 57–65, (1999) English Translation of p. 58, right col., Table 3; with Japanese text.

* cited by examiner

*Primary Examiner*—Sandra M. Nolan
(74) *Attorney, Agent, or Firm*—Browdy and Neimark, P.L.L.C.

(57) ABSTRACT

A thermoplastic shaped-body of trehalose obtainable by concentrating a trehalose solution by heating either to lower the moister content of the solution to a level of not higher than about 8.3 w/w % in the presence of a substance capable of lowering the adhesion of a trehalose solution, or to lower the moisture content of the trehalose solution to a level of not higher than about 2.4 w/w %.

5 Claims, No Drawings

US 6,808,651 B1

THERMOPLASTIC SHAPED-BODY OF TREHALOSE, PROCESS AND USES THEREOF

BACKGROUND OF THE INVENTION

1. Field of the Invention

The present invention relates to a thermoplastic shaped-body of trehalose, process and uses thereof, and more particularly, to a thermoplastic shaped-body of trehalose, process for producing the thermoplastic shaped-body of trehalose characterized in that it comprises a step of preparing the thermoplastic shaped-body of trehalose by forming a trehalose solution, process for producing a shaped-body containing trehalose comprising a step of heating the thermoplastic shaped-body of trehalose to impart it free-flowing ability and forming the resultant, method for lowering the adhesion of a trehalose solution, and uses thereof.

2. Description of the Prior Art

As disclosed in "Chemical Industry", pp. 57–65, June 1999, trehalose is produced from starches as raw materials on an industrial scale and is widely used especially in food industries. However, methods for forming trehalose are restricted in use; is restricted; Trehalose is merely used by mixing crystalline or powdery trehalose with fillers or binders and forming the resulting mixture into tablets; or dissolving by heating in water crystalline or powdery trehalose and other saccharide(s) in an amount exceeding trehalose, concentrating by boiling the resulting mixture, pouring the mixture into molds, cooling the resultant to form candies. These methods require relatively specific machines and high techniques; the obtained shaped-bodies are too monotonic in their shapes. As an arbitral-shape of product containing trehalose, for example, it is substantially difficult to produce a cotton-like shaped-body because commercially-available crystalline or powdery trehalose could not be processed with cotton-candy-machines and could not be processed well into cotton candies like those processed with rock candies. It has been demanded a process for producing shaped-bodies having arbitral shapes by using trehalose.

SUMMARY OF THE INVENTION

The object of the present invention provides a process for easily producing shaped-bodies having arbitral shapes by using trehalose.

To attain the above object the present inventors eagerly studied on the process for producing shaped-bodies of trehalose. As a result, they found that high-trehalose-content glassy shaped-bodies have higher storage-stability than those processed with other saccharides, have desired thermoplasticity and satisfactory heat-resistance, have ease of being formed into shaped-bodies having arbitral shapes after being heated to impart them free-flowing ability, and have ease of being formed repeatedly by using the above properties. Thus, the present inventors accomplished this invention. Based on the findings that high-trehalose-content glassy shaped-bodies have satisfactory thermoplasticity and stability, the present inventors solved the above object by providing a thermoplastic shaped-body of trehalose; a process for producing the thermoplastic shaped-body of trehalose characterized in that it comprises a step of either forming a trehalose solution with a substance capable of lowering the adhesion of the trehalose solution and having a moisture content of not higher than about 8.3 w/w % (throughout the specification, the term "w/w %" is abbreviated as "%" hereinafter, unless specified otherwise), or forming a trehalose solution having no such a substance but a moisture content of not higher than about 2.4%; a process for producing a shaped-body containing trehalose by heating the above thermoplastic shaped-body of trehalose to impart to it free-flowing ability and forming the resultant into a product having an appropriate shape along with or without other substance(s); a method for lowering the adhesion of a trehalose solution characterized in that it comprises a step of, when concentrated by heating, either lowering the moisture content of the trehalose solution to a level of not higher than about 8.3% in the presence of a substance capable of lowering the adhesion of the trehalose solution, or lowering the moisture content of the trehalose solution to a level of not higher than about 2.4%; and a thermoplastic shaped-body of trehalose obtainable by using these processes and methods.

DETAILED DESCRIPTION OF THE INVENTION

The trehalose used in the present invention is also called α,α-trehalose, and the origin is not restricted. For example, trehalose prepared from yeasts as disclosed in Japanese Patent Kokai No. 246,097/95, one prepared from maltose by using phosphorylases as disclosed in Japanese Patent Kokai No. 216,695/83, and ones prepared from starches by using enzymatic saccharifications as disclosed in Japanese Patent Kokai Nos. 170,977/95, 213,283/95, etc. Commercially available high-purity hydrous or anhydrous crystalline trehaloses, etc., can be arbitrariy used. For example, "TREHA®", a high-purity hydrous crystalline trehalose commercialized by Hayashibara Shoji, Inc., Okaya, Japan, can be advantageously used.

The thermoplastic shaped-body of the present invention has satisfactory storage-stability at ambient temperature and moisture, does not substantially change on standing, and has properties of being easily formed into products with an appropriate shape after being melted by heating to impart to it free flowing ability, as well as of maintaining its characteristics even when repeatedly formed and melted twice or more and being easily regenerated.

The thermoplastic shaped-body of the present invention is a shaped-body which comprises a substance capable of lowering the adhesion of a trehalose solution and has a moisture content of not higher than about 8.3%, preferably, not higher than about 4.4%; or which comprises such a substance and has a moisture content of not higher than about 2.4%, preferably, not higher than about 2.0%. Examination of plasticizing temperatures of the above shaped-bodies on heating revealed that they were softened at temperatures of about 70° C. to about 90° C. and in a free-flowing state at temperatures of about 90° C. or more, and even those which require higher temperatures were in such a state at temperatures of about 100° C. to about 120° C. The process for producing the thermoplastic shaped-body of the present invention can be selected from the following appropriate ones: For example, the thermoplastic shaped-bodies can be prepared by providing hydrous or anhydrous crystalline trehalose; and directly or after moistened with appropriate amount of water, heating and melting or melting by heating the resultant at a higher temperature as high as possible, preferably, at a temperature over 160° C., more preferably, a temperature of about 165° C. to about 230° C., most preferably, a temperature of about 170° C. to about 220° C., to make into a glassy state. In addition, the shaped bodies can be prepared by providing aqueous trehalose solutions prepared by the above enzymatic reactions, those prepared by hydrogenating the aqueous trehalose solutions, those prepared by dissolving hydrous crystalline trehalose in water; preferably, those having a moisture content of at least 30%, more preferably, a moisture content of 30% but below 50%, corresponding to those with a trehalose concentration of below 70%, more preferably, about 50% but below 70%; concentrating by heating the resulting trehalose solutions under normal or reduced pressure into high-concentrated trehalose solutions; and allowing the solutions to make into their glassy states.

In the case of concentrating the aqueous trehalose solutions by heating, the moisture content and the solution temperature are closely related each other; Under normal pressure, the temperatures of the aqueous trehalose solutions are 115° C., 125° C., 145° C., 165° C. and 185° C. which correspond to the moisture contents of 15.3%, 9.9%, 5.2%, 2.4% and 1.1%, respectively. During the process for examining their relationship, the present inventors found an unexpected phenomenon that the adhesion of aqueous trehalose solutions greatly changed depending on the moisture content of or the temperature of the solutions when concentrated by heating. The findings are: The adhesion of trehalose solutions increases as the moisture content of the solutions decreases to a level below about 10% when concentrated by heating, particularly, greatly increases when the moisture content decreases to about 8.3% or lower, then reaches a maximum level when the moisture content becomes about 4.4% to about 3.0% after further concentration and the free-flowing ability of the solution decreases. When the trehalose solutions are further continuously concentrated by heating, the adhesion of the solutions reversibly decreases when the moisture content decreases to less than 3%, and the adhesion and the free-flowing ability of the solutions are improved to an extent that does not hinder the handleability of their forming when the moisture content decreases to about 2.4% or lower, preferably, to about 2.0% or lower.

To improve the handleability by lowering the extraordinarily-increased adhesion of trehalose solutions, the present inventors energetically studied and found that the coexistence of a substance capable of lowering the adhesion of trehalose solutions is advantageous, and this effectively decreases the adhesion of high-purity trehalose solutions by a large margin and lowers the foaming of the solutions during their concentration by heating, resulting in improvement of the handleability and easiness of the process for preparing shaped-bodies.

The substances capable of lowering the adhesion of the above trehalose solutions usable in the present invention include any substances as long as they lower the adhesion of the trehalose solutions. For example, preferable substances are organic substances selected from hydrophobic substances such as lipids and carbohydrates, hydrophilic substances such as saccharides and polyalcohols, and emulsifiers having both hydrophobic- and hydrophilic-properties. In use, these substances are preferably present in an amount of less than about 40%, and preferably less than 30% with respect to the trehalose content, on a dry solid basis (d.s.b.).

The lipids used in the present invention can be preferably one or more members from a group consisting of oils, fats and fatty acid; hydrocarbons, which are in liquid forms at about 10o° C. to 230° C., such as alkanes, alkenes and heterocyclic compounds; saccharides such as monosaccharides and oligosaccharides excluding trehalose, mono- and di-saccharide alcohols; polyalcohols such as glycerine, diethylene glycol, and propylene glycol; and emulsifiers such as sucrose fatty acid esters, glycerine fatty acid esters, poly glycerine fatty acid esters, and lecithin.

As described above, the thermoplastic shaped-body of trehalose of the present invention can be produced by either concentrating trehalose solutions to give a prescribed moisture content, preferably, to a moisture content of not higher than about 8.3%, by using the method for lowering the adhesion of the solutions by adding to trehalose the above substances capable of lowering the adhesion of the solutions, and forming the concentrates into shaped-bodies in a glassy state; or concentrating trehalose solutions to give a preferable moisture content of not higher than about 2.4% without adding the substance capable of lowering the adhesion of the solutions and forming the concentrates into shaped-bodies in a glassy state. The method of forming used arbitrarily in the present invention includes, for example, conventional ones such as stamping molding, cutting molding, atmospheric molding, molding in water or oils, extrusion, pressure forming, particularly, biaxial extrusion, etc.

To keep satisfactory shelf-life and thermoplasticity, the thermoplastic shaped-body thus obtained should preferably contain as much trehalose as possible; usually, those which contain trehalose in an amount over 60%, d.s.b., preferably, not less than about 70%, more preferably, not less than about 80%, and more preferably, not less than about 90%.

The form of the thermoplastic shaped-body used preferably in the present invention can be those which are easily processed on conventional forming- or molding-machines or apparatuses when the thermoplastic shaped-body as a material is heated to show free-flowing ability and formed into an appropriate shape; and those which can be easily heated, and if necessary, after being pressed or reduced, to easily melt to show free-flowing ability, and formed to impart to it an appropriate shape by using the above machines or apparatuses.

Preferable concrete examples of the forms of the thermoplastic shaped-body are usually those having a short diameter of about 0.1–20 mm, and preferably, about 2–15 mm, and a longer diameter of equal to or longer than the short diameter. As the forms of the thermoplastic shaped-body, granules, spheres, hemispheres, elliptical spheres, short rods, short pyramids, half corns, cubes, rectangular parallelepipeds, short tubes, and fibers can be arbitrarily used. Generally, the form called pellet is preferably used.

The thermoplastic shaped-body thus obtained generally contains a substance capable of lowering the adhesion of trehalose solutions and has a moisture content of not higher than about 8.3%, preferably, not higher than about 4.4%; or has a moisture content of not higher than about 2.4%, preferably, not higher than about 2.0% without containing the above substance. In either case, the thermoplastic shaped-body contains trehalose in an amount of over 60%, d.s.b., and preferably, in an amount of not lower than about 70%, d.s.b., wherein the trehalose is amorphous and transparent or translucent; relatively-high in moisture-resistant, heat-resistant, acid-resistant, alkaline-resistant, and shelf-life; and easily handleable. The thermoplastic shaped-body of the present invention can be used, for example, by dissolving in a small amount of hot water to form a high trehalose content paste and further used as a base for pulverization by adding a trehalose crystal see to the resulting mixture to crystallize trehalose to facilitate the pulverization.

The most valuable use of the thermoplastic shaped-body of the present invention is for the use using its thermoplasticity; the thermoplastic shaped-body can be arbitrarily reheated to melt to impart it free-flowing ability, then directly formed into appropriate shapes; or can be arbitrarily formed into shaped-bodies containing trehalose by processing with other substances in such a manner of coating, mixing, fixing, inserting, enclosing, etc.

Varying depending on the kind or content of the substances capable of lowering the adhesion of trehalose solutions, the heating conditions used in the present invention are those which melt and soften the thermoplastic shaped-bodies of trehalose, preferably, which make them into their liquid states or free-flowing conditions for ease of forming into appropriate shapes. The softening temperature is generally adjusted by heating to about 70° C. to about 90° C. as a product temperature, while the temperature for imparting free-flowing ability is adjusted by heating to about 90° C. or higher, and preferably about 100° C. to about 120° C. or higher as a product temperature. In general, when the thermoplastic shaped-bodies have a relatively-high moisture content of not higher than about 8.3% but over 2.4%, the temperature for imparting free-flowing ability is set to a relatively-low temperature, generally, to a temperature of at least about 90° C., and preferably to a temperature of about 100° C. to about 160° C. While in the case of having a relatively-low moisture content of about 2.4% or lower, the thermoplastic shaped-bodies are heated to a relatively-high temperature, generally, to a temperature of about 100° C. or higher, and preferably to a temperature selected from about 110° C. to about 230° C.

When formed along with other substances, the thermoplastic shaped-bodies of trehalose can be selectively treated, for example, by first mixing with other substances, then heating to impart them free-flowing ability and forming into appropriate shapes; or first heating only the thermoplastic shaped-bodies of trehalose to impart them free-flowing ability, then mixing with other substances and forming into appropriate shapes. If necessary, the thermoplastic shaped-bodies of trehalose can be moistened or admixed with a small amount of water to lower their melting temperatures or to accelerate the mixing.

Any substances can be arbitrarily used as the other substances used in the present invention as long as they can be formed into stable shaped-bodies of the present invention when used in combination with the thermoplastic shaped-bodies of trehalose, materials and crude ingredients including additives. generally used in the fields including chemical industries where the thermoplastic shaped-bodies of trehalose can be used, for example, in the fields of food products, cosmetics, pharmaceuticals, agriculture, fishery, live stocks, plastics, household articles, etc. More particularly, the followings, which are generally used in one or more of the aforesaid fields, can be selectively used depending on purposes: For example, a sweetener, filler, coloring agent, color-developing agent, fermentation-controlling agent, flavor, aromatic, enhancer, baking powder, preservative, sterilizer, oxidation-preventing agent, antioxidant, bleaching agent, gum, stabilizer, emulsifier, tenderizer, quality-improving agent, seasoning, spice, wax, bitter agent, sour agent, processing aid, enzyme preparation, gum base, surfactant, plasticizer, smooth and gloss-imparting agent, solubilizing agent, reductant, buffer, base, adsorbent, taste-imparting agent, binder, suspending agent, coating agent, lubricant, lubricant-controlling agent, filler, anti-foaming agent, refreshing agent, adhesive, enhancer, mastication agent, sugar-coating agent, isotonicity-imparting agent, sticking agent, stickiness enhancer, agent for consistency, consistency-imparting agent, inflammatory inhibitor, heat-generating agent, foaming agent, skin protective, excipient, disperser, pH-controlling agent, decaying agent, decaying aid, anti-rust agent, anti-humectant, antiseptic, fungicidal, preservative, pain-removing agent, vitamin, antibiotic, chemotherapeutic agent, anti-allergic, anti-histaminic, antalgic, antipruritic, astringent, anti-inflammatory, steroid, hormone, cardiac, dental/oral agent, anastaltic, ultraviolet absorber, algicide, thermoplastic resin, synthetic resin, crystallization-preventing agent, deterioration-preventing agent, retrogradation-preventing agent, burning preventive, resin-hardening agent, coagulant; foaming agent, foaming stabilizer, anti-static agent, curing agent, etc. In particular, examples of the above materials and crude ingredients used in the field of food products are saccharides such as starches, amyloses, amylopectins, pregelatinized starches, dextrins, substantially-indigestive dextrins, starch derivatives, pullulan, pectin, alginic acid, polysaccharides, dietary fibers, monosaccharides, oligosaccharides including functional oligosaccharides, and sugar alcohols; proteins such as casein, gelatin, collagen, albumin, and myosin; and others including polypeptides, oligopeptides, amino acids, oils and fats, and minerals, as well as products of agriculture, fishery, and live stocks such as seeds including rice, barley, wheat, corn, common millet, foxtail millet, soy bean, ginko nut, and almond.

The more the trehalose content in the thermoplastic shaped-bodies of trehalose obtained by forming with other substances, the more they are preferably used since trehalose present in the shaped-bodies generally improves the stability of relatively-unstable functional substances and effective ingredients such as the aforesaid vitamins, lipids, proteins, effective substances, and physiologically-active substances. In general, the trehalose content is relatively-low in the shaped-bodies which the surfaces are coated with trehalose, while the content is relatively-high in those prepared by homogeneously mixing trehalose with other substances and solidifying the whole contents. In the present invention, since the thermoplastic shaped-bodies of trehalose should be formed or molded into appropriate shapes, they are generally incorporated into other substances in an amount of at least about 1.0%, preferably, at least about 2.0%, more preferably, at least about 5.0%, and more preferably, at least about 10% to the other substances, d.s.b. The form of the resulting shaped-bodies is appropriately selected from those which comprise point-, line-, face-, and stereoscopic-structures such as granules, rods, plates, sheets, films, tubes, laminates, and sponges.

Depending on final shapes, the method for forming the above shaped-bodies is appropriately selected from conventional ones such as stamping molding, cutting molding, injection molding, extrusion, blowing molding, plate molding, casting molding, compression molding, pressure forming, calendar molding, laminating molding, film forming, rotation molding, spraying molding, fixing molding, puffing molding, blister molding, etc.

Depending on other substances used in combination and functional substances and effective ingredients contained therein, the above shaped-bodies containing trehalose obtained by transforming into other forms can be arbitrarily used after being formed into food products, cosmetics, pharmaceuticals, products for agriculture, fishery, and live stocks, gradually-disintegrable plastics, biodegradable shaped-bodies, and house articles, etc.

The following experiments describe the present invention:

Experiment 1
Influence of Boiling Down Temperature or Moisture Content of Saccharide Solutions on their Adhesiveness and Storage Stability of Shaped Bodies formed Therewith As saccharides, non-reducing saccharides, i.e., anhydrous crystalline maltitol and crystalline trehalose dihydrate were provided, respectively placed in a pan, and heated after being admixed with water into a 50% aqueous saccharide solution. The aqueous solutions were heated to boiling; and concentrated. When the saccharide solutions reached respective temperatures of 120° C., 130° C., 140° C., 150° C., 160° C., 170° C., 180° C. and 190° C., a glass rod having a diameter of 4 mm was inserted into each saccharide solution three centimeters in depth from the liquid surface, followed by holding the glass rod thereat for three seconds and then pulling up gently. The weight of the saccharide solution adhered to the glass rod was calculated by weighing the total weight of the glass rod and the saccharide solution and substracting only the weight of the glass rod from the total weight. Each saccharide solution boiled down was sampled and placed in a small depositor and cooled to ambient temperature into a shaped-body as a sample, 20 mm in length, 15 mm in width, and 5 mm in thickness. Shaped-bodies formed within 24 hours after processing were measured for misture. The moisture content was determined by the diatomaceous earth method under overnight-drying conditions at 80° C. and at a reduced pressure of 50 mmHg or lower.

A portion of each of the same samples was placed in a Petri diah and allowed to stand at a relative humidity of about 70% and at 25° C. for 10 days before observing the presence of adhesion.

The level of adhesion was evaluated by examining the level of the samples adhered to the Petri dishes after absorbing moisture and classifying the levels into two ranks of "Yes" and "No" as a rough indication of storage stability. The results are in Table 1.

As evident from Table 1, it was found that, in the case of trehalose, the weight of trehalose solution adhered to the glass rod unexpectedly and remarkably increased from 120C, corresponding to a trehalose solution with a moisture content of about 12%, to 160° C., corresponding to a trehalose solution with a moisture content of about 3.0%, respectively; while the moisture content decreased at temperatures over the above temperature range, meaning that less of the trehalose solution adhered to the glass rod as the temperature increased from 160° C. to 190° C. in spite of the increment of trehalose concentration.

It was found that the adhesive of trehalose solution highly increased at temperatures of 130° C. or higher, corresponding to a trehalose solution with a moisture content of about 8.3%, and reached to a maximum level at temperatures of about 150° C. to about 160° C., corresponding to a trehalose solution with a moisture contents of about 4.4% to about 3.0%, then gradually decreased at temperatures of over 160° C., corresponding to a trehalose solution with a moisture contents of less than about 3%.

In the case of the maltitol solution as a control, it was observed that the amount of the maltitol solution adhered to the glass rod slightly increased at temperatures from 120° C. to 150° C. and decreased at temperatures from 150° C. to 190° C., and found that the level of alteration was negligible as compared with trehalose solution. Based on these data, it was revealed that, when trehalose solution is boiled down, the adhesion of trehalose solution highly increases up to 160° C. and this hinders the processibility during its forming or molding, and that the drawback should be improved. It was also found that the adhesion of trehalose solution decreased when boiled down at temperatures of 165° C. or higher, corresponding to a trehalose solution with a moisture content of about 2.4% or lower, and the free-flowing ability was remarkably improved to ease the processibility of the handling of trehalose solution by a large margin. It was found that, unlike shaped-bodies processed with maltitol solution, those with trehalose solution do not substantially change on standing when stored at a relative humidity of 70% and at ambient temperature and have satisfactory moisture-resistant and storage stability.

Experiment 2
Method for Lowering Adhesion

Five hundred and fifty parts by weight of crystalline trehalose dihydrate were placed in a stainless-steel pan, admixed with, as a substance capable of lowering adhesion of trehalose solution, 50 parts by weight of safflower oil, 50 parts by weight of salad oil, 150 parts by weight of anhydrous crystalline maltitol, or 158 parts by weight of crystalline lactitol monohydrate, and further mixed with 450 parts by weight of water, followed by completely dissolving the saccharides while heating. Then, the heating was continued to boil down each saccharide solution. When reached to temperatures of 120C, 130° C., 140° C., 150° C., 160° C., 170° C. and 180° C., the saccharide solutions were subjected

TABLE 1

| Saccharide | Item measured | Boiling down temperature (° C. under normal pressure) | | | | | | | | | |
|---|---|---|---|---|---|---|---|---|---|---|---|
| | | 120 | 130 | 140 | 150 | 155 | 160 | 165 | 170 | 180 | 190 |
| Trehalose | Adhered content (g) | 0.230 | 0.569 | 0.890 | 1.250 | 1.474 | 1.726 | 1.580 | 0.915 | 0.761 | 0.579 |
| | Moisture content (%) | 12.1 | 8.3 | 6.1 | 4.4 | 3.6 | 3.0 | 2.4 | 2.0 | 1.3 | 0.9 |
| | Adhesion | No | No | No | No | No | No | No | No | No | No |
| Maltitol | Adhered content (g) | 0.200 | 0.317 | 0.338 | 0.369 | 0.355 | 0.335 | 0.345 | 0.313 | 0.294 | 0.257 |
| | Moisture content (%) | 9.1 | 5.5 | 4.1 | 3.2 | 2.7 | 2.5 | 2.1 | 1.9 | 1.4 | 0.9 |
| | Adhesion | Yes | Yes | Yes | Yes | Yes | Yes | Yes | Yes | Yes | Yes | to measurement of the weight of each saccharide solution adhered to a glass rod. In accordance with the method in Experiment 1, using the boiled-down solutions, they were respectively processed into shaped-bodies, then measured for moisture content within 24 hours after their processings. The results are in Table 2 where the therhalose content in each saccharide solution is shown in parallel, based on a dry solid.

with a moisture content of about 3.0%, remarkably lowered; and more particularly, even under higher temperatures of over 160° C. for boiling down, the substances more reduced the adhesion of trehalose solution and remarkably improved the free-flowing ability, resulting in a conclusion that the substances outstandingly improved the handleability of thermoplastic shaped-bodies of trehalose during their processings.

TABLE 2

| Saccharide | Coexisting substance (Trehalose content (%, d.s.b.)) | Item | Boiled down temperature (° C. under normal pressure) | | | | | | |
| --- | --- | --- | --- | --- | --- | --- | --- | --- | --- |
| | | measured | 120 | 130 | 140 | 150 | 160 | 170 | 180 |
| Trehalose | Non (100%) | Adhered content (g) | 0.230 | 0.569 | 0.890 | 1.250 | 1.726 | 0.915 | 0.761 |
| | | Moisture content (%) | 12.1 | 8.3 | 6.1 | 4.4 | 3.0 | 2.0 | 1.3 |
| | Safflower oil (about 91%) | Adhered content (g) | 0.150 | 0.194 | 0.225 | 0.256 | 0.257 | 0.277 | 0.278 |
| | | Moisture content (%) | 12.0 | 8.2 | 6.1 | 4.4 | 3.0 | 2.0 | 1.3 |
| | Salad oil (about 91%) | Adhered content (g) | 0.195 | 0.499 | 0.512 | 0.596 | 0.538 | 0.481 | 0.428 |
| | | Moisture content (%) | 12.1 | 8.3 | 6.1 | 4.3 | 3.0 | 2.0 | 1.3 |
| | Maltitol (about 77%) | Adhered content (g) | 0.230 | 0.538 | 0.861 | 0.987 | 0.786 | 0.607 | 0.570 |
| | | Moisture content (%) | 11.4 | 7.8 | 5.7 | 4.2 | 2.9 | 2.0 | 1.3 |
| | Lactitol (about 77%) | Adhered content (g) | 0.265 | 0.466 | 0.773 | 0.862 | 0.919 | 0.893 | 0.574 |
| | | Moisture content (%) | 11.5 | 7.7 | 5.7 | 4.1 | 2.9 | 2.0 | 1.3 |

As evident from Table 2, it was found that the coexistence of any of safflower oil, salad oil, maltitol, and lactitol significantly inhibited the remarkable increment of the adhesion of trehalose solution at temperatures from 120° C. to 160° C., particularly, temperatures from 130° C., corresponding to trehalose solution with a moisture content of about 8.3%, to 160° C., corresponding to a trehalose solution with a moisture content of about 3.0%; and strongly lowered the adhesion. Particularly, it was found that the adhesion peaks of all the trehalose solutions at temperatures in the range of about 150° C., corresponding to a solution with a moisture content of about 4.4%, to about 160° C., corresponding to a trehalose solution with a moisture content of about 3.0%, remarkably lowered, resulting in strong reduction of their adhesion.

It was also found that, under the coexistence of the above substances, the adhesion of all the trehalose solutions at temperatures of over 160° C. was lower than that of the trehalose solutions alone.

Based on these, it was found that the strong increment of adhesion of trehalose solutions observed during their boiling down at temperatures from 130° C., corresponding to a trehalose solution with a moisture content of about 8.3%, to 160° C., corresponding to a trehalose solution with a moisture content of about 3.0%, is remarkably inhibited by coexisting substances capable of lowering the adhesion of trehalose solution, for example, oils and fats such as safflower oil and salad oil, and saccharides such as maltitol and lactitol. Particularly, the adhesion peak of trehalose solution observed at temperatures from about 150° C., corresponding to a trehalose solution with a moisture content of about 4.4%, to about 160° C., corresponding to a trehalose solution The following Example A describes the thermoplastic shaped-bodies of trehalose according to the present invention, and Example B describes the shaped-bodies containing trehalose as the use examples of Example A:

Example A-1

Short-rod Shaped-body

One hundred and ten parts by weight of "TREHA®", a high-purity crystalline trehalose hydrate commercialized by Hayashibara Shoji, Inc., Okayama, Japan were placed in a dissolving tank, and admixed with and dissolved by heating in 90 parts by weight of water. The solution was concentrated by heating into a concentrate with a temperature of about 190° C. and a moisture content of about 0.9% to lower the adhesion of the concentrated Then, the resulting concentrate was formed by feeding to an extruder, cooled to ambient temperature to obtain a short-rod thermoplastic shaped-body of trehalose, about 2 mm in diameter and about 4 mm in length. Since the product was a colorless, transparent or translucent, and substantially amorphous shaped-body having satisfactory thermoplasticity and storage-stability under indoor circumstances, it can be arbitrarily reheated to a temperature of about 100° C. to about 230° C., as a product temperature, to impart it free-flowing ability, then transformed or processed into a shaped-body with an appropriate form with or without using other substances having different functions. The product can be also used arbitrarily for preparing a paste containing trehalose by dissolving in a relatively-small amount of hot water, and the resulting paste can be used intact in an amorphous form or used as a powdered base after crystallization of trehalose.

Example A-2
Elliptic Spherical Shaped-body

Similarly as in Example A-1, a high-purity crystalline trehalose hydrate was dissolved by heating, and the solution was concentrated by heating, admixed to lower the adhesion of the solution with an olive oil in an amount of about 5% to trehalose, d.s.b., when reaching roughly to a temperature over 110° C. at which the adhesion of the concentrate began to increase, and continued concentrating by heating until reaching to a temperature of about 170° C., corresponding to a moisture content of about 2.0%. The resulting concentrate was fed to a stamping-forming machine to obtain an elliptic-spherical thermoplastic shaped-body of trehalose, about 15 mm in length. Since the product was a colorless, transparent or translucent, and substantially amorphous shaped-body having thermoplasticity and satisfactory storage-stability under indoor circumstances, it can be arbitrarily reheated to a temperature of about 100° C. to about 230° C., as a product temperature, to impart it free-flowing ability, then transformed or processed into a shaped-body with an appropriate form with or without using other substances having different functions. The product can be also used arbitrarily for preparing a paste containing trehalose by dissolving in a relatively-small amount of hot water, and the resulting paste can be used intact in an amorphous form or used as a powdered base after crystallization of trehalose.

Example A-3
Short Square-pillar Shaped-body

Similarly as in Example A-1, a high-purity crystalline trehalose hydrate was dissolved by heating, and the solution was concentrated by heating, admixed to lower the adhesion of the solution with propylene glycol in an amount of about 3% to trehalose, d.s.b., when reaching roughly to a temperature of over 110° C. at which the adhesion of the concentrate began to increase and continued heating to boil down until reaching to a temperature of about 165° C., corresponding to a moisture content of about 2.4%. The resulting concentrate was fed to a cutting-forming machine to obtain a short square-pillar thermoplastic shaped-body, a side length of about 5 mm and about 10 mm in height. Since the product was a colorless, transparent or translucent, and substantially amorphous shaped-body having thermoplasticity and satisfactory storage-stability under indoor circumstances, it can be arbitrarily reheated to a temperature of about 100° C. to about 230° C., as a product temperature, to impart it free-flowing ability, then transformed or processed into a shaped-body with an appropriate form with or without using other substances having different functions. The product can be also used arbitrarily for preparing a paste containing trehalose by dissolving in a relatively-small amount of hot water, and the resulting paste can be used intact in an amorphous form or used as a powdered base after crystallization of trehalose.

Example A-4
Hemispheric Shaped-body

According to the method disclosed in Japanese Patent Kokai No. 73,482/96, a seed culture of a mutant of Rhizoblum sp. M-11 strain, FERM BP-4130, was inoculated to and cultured in a nutrient culture medium for about 70 hours by a fermenter. After culturing, the resulting culture was filtered to remove cells using an SF membrane to yield an about 100 l culture supernatant, followed by concentrating the supernatant with a UF membrane to obtain an about five liters of a crude enzyme concentrate containing about 410 units/ml of a non-reducing saccharide-forming enzyme and about 490 units/ml of a trehalose-releasing enzyme. Corn starch was suspended into an about 33% starch suspension which was then subjected to the action of α-amylase to obtain a liquefied solution with a DE (dextrose equivalent) of about four. To the liquefied solution were added 0.02 ml/g starch of the above crude enzyme concentrate, 500 units/g starch of isoamylase, and five units/g starch of cyclomaltodextrin glucanotransferase, then subjected to an enzymatic reaction at pH 6.2 and at 40° C. for 48 hours. The reaction mixture was heated to inactivate the remaining enzymes, then admixed with 10 units/g substrate of glucoamylase, and enzymatically reacted at 50° C. for 10 hours. The resulting reaction mixture, containing 85.6% trehalose, d.s.b., was heated to inactivate the remaining enzyme, and according to conventional manner, purified by decoloration and desalting, and concentrated into a 45% syrup, i.e., a relatively-low reducing saccharide syrup enriched with trehalose. According to conventional manner, the syrup was hydrogenated, purified by decoloration and desalting, and concentrated into a syrup containing about 85% trehalose, d.s.b., and others mainly composed of sorbitol. The syrup was concentrated and boiled down by heating to a temperature of about 180° C. or a moisture content of about 1.3% and to lower its adhesion, and the concentrate was dropped into salad oil through a fine tube and solidified by cooling to obtain a hemispheric thermoplastic shaped-body of trehalose, about 8 mm in base diameter. Since the product was a colorless, transparent or translucent, and substantially amorphous shaped-body having thermoplasticity and satisfactory storage-stability under indoor circumstances, it can be arbitrarily reheated to a temperature of about 100° C. to about 230° C., as a product temperature, to impart it free-flowing ability, then transformed or processed into a shaped-body with an appropriate form with or without using other substances having different functions. The product can be also used arbitrarily for preparing a paste containing trehalose by dissolving in a relatively-small amount of hot water, and the resulting paste can be used intact in an amorphous form or used as a powdered base after crystallization of trehalose.

Example A-5
Fibrous Shaped-body

Using an electric furnace, crystalline trehalose hydrate was melted by heating to a temperature of about 200–210° C. or to a moisture content of about 0.5% or lower. While pouring out of an outlet provided in the basement of the furnace, the melt was blown by air to obtain a fibrous shaped-body, about 0.1–0.2 mm in diameter, followed by disrupting the fibrous shaped-body into a short-rod fibrous shaped-body, less than about 20 mm in length. Since the product was a colorless, transparent or translucent, and substantially amorphous shaped-body having thermoplasticity and satisfactory storage-stability under indoor circumstances, it can be arbitrarily reheated to a temperature of about 100° C. to about 230° C., as a product temperature, to impart it free-flowing ability, then transformed or processed into a shaped-body with an appropriate form with or without using other substances having different functions. The product can be also used arbitrarily for preparing a paste containing trehalose by dissolving in a relatively-small amount of hot water, and the resulting paste can be used intact in an amorphous form or used as a powdered base after crystallization of trehalose.

Example A-6
Short-rod Shared-body

A thermoplastic shaped-body of trehalose obtained by the method in Example A-3 was heated to about 120° C. and fed to an extruder to obtain a short-rod thermoplastic shaped-body of trehalose, about 2 mm in diameter and about 4 mm in length. Since the product was a colorless, transparent or translucent, and substantially amorphous shaped-body having a satisfactory thermoplasticity and storage-stability under indoor circumstances, it can be arbitrarily reheated to a temperature of about 100° C. to about 230° C., as a product temperature, to impart it free-flowing ability, then transformed or processed into a shaped-body with an appropriate form with or without using other substances having different functions. The product can be also used arbitrarily for preparing a paste containing trehalose by dissolving in a relatively-small amount of hot water, and the resulting paste can be used intact in an amorphous form or used as a powdered base after crystallization of trehalose.

Example A-7
Elliptic-spherical Shaped-body

One hundred parts by weight of high-purity crystalline trehalose hydrate and 10 parts by weight of "MABITO", a high-purity anhydrous crystalline maltitol commercialized by Hayashibara Shoji, Inc., Okayama, Japan were placed in a dissolving tank, and admixed with and dissolved by heating in 90 parts by weight of water. After being admixed with 0.2 part by weight of sucrose stearic acid ester as an emulsifier, the solution was concentrated and boiled down by heating to a temperature of about 150° C. or a moisture content of about 4.3%. The concentrate was fed to a stamping-forming machine to obtain an elliptic-spherical thermoplastic shaped-body of trehalose, about 15 mm in length. Since the product was a colorless, transparent or translucent, and substantially amorphous shaped-body having thermoplasticity and satisfactory storage-stability under indoor circumstances, it can be arbitrarily reheated to a temperature of about 90° C. to about 160° C. to impart to it free flowing ability, then transformed or processed into a shaped-body with an appropriate form with or without using other substances having different function. The product can also be used arbitrarily for preparing a paste containing trehalose by dissolving it in a relatively-small amount of hot water, and the resulting paste can be used intact in an amorphous form or used as a powdered base after crystallization of trehalose.

Example A-8
Short-rod Shaped-body

Ninety-five parts by weight of high-purity crystalline trehalose hydrate and 18 parts by weight of palatinit were placed in a dissolving tank, and admixed with and dissolved by heating in 63 parts by weight of water. The solution was placed in a concentrator, concentrated to boil down by heating to 125° C. under reduced pressure, continued concentrating by heating under reduced pressure while keeping the temperature until reaching to a moisture content of about 1.0%. Similarly as in Example A-1, the concentrate was subjected to an extruder for forming, cooled to ambient temperature to obtain a short-rod thermoplastic shaped-body of trehalose, about 2 mm in diameter and about 4 mm in length. Since the product was a colorless, transparent or translucent, and substantially amorphous shaped-body having thermoplasticity and satisfactory storage-stability under indoor circumstances, it can be arbitrarily reheated to a temperature of about 90° C. to about 160° C. to impart it free-flowing ability, then transformed or processed into a shaped-body with an appropriate form with or without using other substances having different functions. The product can be also used arbitrarily for preparing a paste containing trehalose by dissolving in a relatively-small amount of hot water, and the resulting paste can be used intact in an amorphous form or used as a powdered base after crystallization of trehalose.

Example A-9
Short-rod Shaped-body

Eighty parts by weight of high-purity crystalline trehalose hydrate and 20 parts by weight of high-purity anhydrous crystalline maltitol were mixed and pulverized, then mixed with about 20-fold volumes of salad oil preheated to about 180° C. The mixture was heated to melt into a melt with a moisture content of about 1.3% which was then transferred to a cutting molder and processed therewith into a short-rod thermoplastic shaped-body of trehalose, about 5 mm in diameter and about 8 mm in length. Since the product was a colorless, transparent or translucent, and substantially amorphous shaped-body having thermoplasticity and satisfactory storage-stability under indoor circumstances, it can be arbitrarily reheated to a temperature of about 90° C. to about 160° C. to impart to it free flowing ability, then transformed or processed into a shaped-body with an appropriate form with or without using other substances having different functions. The product can also be used arbitrarily for preparing a paste containing trehalose by dissolving in a relatively-small amount of hot water, and the resulting paste can be used intact in an amorphous form or used as a powdered base after crystallization of trehalose.

Example A-10
Disk-type Shaped-body

Eighty-five parts by weight of high-purity crystalline trehalose and 15 parts by weight of "HS-300", a hydrogenated starch syrup commercialized by Hayashibara Shoji, Inc., Okayama, Japan were mixed to homogeneity. The mixture was packed in a teflon mold having a plurality of pits, about 5 mm in diameter and about 3 mm in depth, heated to melt on a microwave oven, boiled down to lower the moisture content to about 2.0%, and cooled to obtain a disk-type thermoplastic shaped-body of trehalose, about 8 mm in diameter and about 3 mm in thickness. Since the product was a colorless, transparent or translucent, and substantially amorphous shaped-body having thermoplasticity and satisfactory storage-stability under indoor circumstances, it can be arbitrarily reheated to a temperature of about 90° C. to about 160° C. to impart to it free-flowing ability, then transformed or processed into a shaped-body with an appropriate form with or without using other substances having different functions. The product can also be used arbitrarily for preparing a paste containing trehalose by dissolving it in a relatively-small amount of hot water, and the resulting paste can be used intact in an amorphous form or used as a powdered base after crystallization of trehalose.

Example B-1
Cotton-like Shaped-body

To one part by weight of a thermoplastic shaped-body of trehalose, obtained by the method in Example 7, was adhered by homogeneously spraying 0.05 part by weight of a concentrated lemon-juice, dried, and fed to a cotton-candy machine and heated to melt at temperatures over about 100° C. to obtain a cotton candy. Unlike conventional cotton-candy processed with sugar having the demerits of easily reducing its volume as the time goes by and having no property of being acidulated, the product is an acid-punched, lemon-flavored, cotton-candy containing trehalose which deteriorates less after processing than conventional cotton candy.

Example B-2
Coated Shaped-body

One hundred parts by weight of wheat flour, two parts by weight of yeast, five parts by weight of sugar, one part by weight of maltose, and 0.1 part by weight of yeast food were in a usual manner kneaded with water. The mixture was fermented at 26° C. for two hours, then further aged for 30 min, followed by rounding with hands the resulting dough for bread. A thermoplastic shaped-body of trehalose, obtained by the method in Example A-4, was partially inserted into the dough from its surface in an amount of about 2% to the dough, d.s.b. According to conventional manner, the dough was baked at about 180° C. The product is a unique and interesting bread having a melt-distorted shaped-body of trehalose on its surface, and is a high-quality bread having a satisfactory appearance and texture, as well as an adequate elasticity and mild sweetness.

Example B-3
Coated Shaped-body

Sixty parts by weight of butter, 20 parts by weight of sugar, 20 parts by weight of maltose, and 10 parts by weight of a crystalline trehalose dihydrate powder were well kneaded, then mixed with 40 parts by weight of chicken egg to obtain a creamy product. To the product were added 140 parts by weight of soft flour, 10 parts by weight of corn starch, and three parts by weight of pullulan. The resulting dough for cookie was passed through a mum cap over a plain plate to form a flower-shaped product, followed by adhering over the product a thermoplastic shaped-body of trehalose, obtained by the method in Example A-5, in an amount of about one percent, d.s.b., to the dough, and baking the resulting product at about 170° C. for 15 min. In the baked product having a satisfactory flavor, taste a mouth feel, the cookie dough and the unique melt-distorted shaped-body containing trehalose well adhered each other without separation.

Example B-4
Granular Shaped-body

A powder mixture, consisting of 15 parts by weight of a thermoplastic shaped-body of trehalose obtained by the method in Example A-2, two parts by weight of plain yogurt, and 10 parts by weight of anhydrous trehalose powder, was heated to about 100° C. and fed to a biaxial extruder to produce a granular shaped-body containing trehalose. The product is a yogurt-flavored sweet shaped-body and can be arbitrarily used as a confectionery material for premixes, frozen deserts, cakes, etc., and as a therapeutic nutrient for intubation feedings; and can be incorporated into whipped margarine creams, spreads, cheese cakes, jellies, etc. to obtain a yogurt-flavored food product.

Example B-5
Trapezoidal Shaped-body

Thirty parts by weight of a thermoplastic shaped-body of trehalose obtained by the method in Example A-3, one part by weight of α-glucosyl-L-ascorbic acid, one part by weight of α-glucosyl hesperidin, one part by weight of sodium sulfate, and one part by weight of aqueous alcohol dissolving an adequate amount of a color and a flavor were heated at about 100° C. and fed to a pressure-forming machine to obtain a trapezoidal shaped-body containing trehalose. The product, weighing about 10 g, is suitably used as a skin-beautifying and skin-whitening agent and used after being immersed in a bath tab. Similarly as in bath use, the product can be arbitrarily used after dissolving it in a face-washing water or cosmetic liquid.

Example B-6
Elliptic-spherical Shaped-body

A mixture, consisting of 500 parts by weight of a thermoplastic shaped-body of trehalose obtained by the method in Example A-2, 270 parts by weight of an egg yolk powder, 209 parts by weight of a skim milk powder, 4.4 parts by weight of sodium chloride, 1.85 parts by weight of potassium chloride, four parts by weight of magnesium sulfate, 0.01 part by weight of thiamine, 0.1 part by weight of sodium ascorbate, 0.6 part by weight of vitamin E acetate, and 0.04 part by weight of nicotinic acid amide, were heated to about 100° C. and fed to a pressure-forming machine to obtain an elliptic-spherical shaped-body containing trehalose. The product, weighing about five grams, is satisfactorily used as a nutrient shaped-body by melting in the mouth as a therapeutic nutrient for sick persons and as a nutrient for healthy persons to maintain and promote their heath.

Example B-7
Granular Shaped-body

A mixture of 10 parts by weight of a thermoplastic shaped-body of trehalose, obtained by the method in Example A-1, and one part by weight of a sodium carbonate powder was heated to about 100° C. and fed to a biaxial extruder to produce a granular shaped-body containing trehalose. The product can be widely used in a variety of uses as an easily handleable pH-controlling agent with less fear of causing scattering of the sodium carbonate powder.

Example B-8
Short-tubular Shaped-body

A mixture of 100 parts by weight of a thermoplastic shape-body trehalose obtained by the method in Example A-2, 200 parts by weight of fish flour, 20 parts by weight of pregelatinized starch, three parts by weight of pullulan, and 10 parts by weight of water was heated to about 100° C. and fed to an extruder to obtain a short-tubular shaped-body containing trehalose. The product was soaked in a solution of about 10% shellac in alcohol, then instantly taken out from the solution, and dried with hot air to obtain a short-tubular shaped-body containing trehalose. The product is a feed with lesser fear of spoiling water and can be satisfactorily used as a feed for breeding or enjoying fishes, shellfishes, and cruschymata, and crustaceans independently of whether the animals are in freshwater or sea water.

Example B-9
Flowerpot

A mixture of 100 parts by weight of a thermoplastic shaped-body of trehalose obtained by the method in Example A-6, 15 parts by weight of glycerine, and 50 parts by weight of used-paper pulp was heated to about 150° C. and fed to an injection molder to obtain a flowerpot. The resulting flowerpot was soaked in a melted wax and cooled to produce a flowerpot containing trehalose. Since the product is gradually degradable and biodegradable, it can be advantageously used as a flowerpot for transplanting plants therewith without damaging the plants' roots.

Example B-10
Short-rod Shaped-body

A mixture of 60 parts by weight of a thermoplastic shaped-body of trehalose, obtained by the method in Example A-1, 30 parts by weight of a coral powder, 0.1 part by weight of α-glucosyl rutin, and two parts by weight of corn steep liquor was heated to about 110° C. and fed to an extruder to obtain a plant activator of short-rod shaped-body containing trehalose. The product is satisfactorily used as a durable plant-activator because it needs no container, has easy handleability, and in use dissolves and disintegrates in an appropriate rate.

Example B-11

Golf Tee

A mixture of 10 parts by weight of a thermoplastic shaped-body of trehalose, obtained by the method in Example A-4, and 0.5 part by weight of pullulan was heated to about 160° C. and fed to an injection molder to form a golf tee which was then soaked in a solution of about 10% shellac in alcohol and dried to obtain the captioned product. After being broken into pieces by shot, the product is gradually disintegrated by rainwater and biodegraded. Thus, the product does not spoil the beauty and environment of golf course. In addition, adequately dispersed trehalose contained in the golf tee activates the growth of lawn in the golf course.

Example B-12

Film Shaped-body

A mixture of 92 parts by weight of low-density polyethylene, eight parts by weight of a thermoplastic shaped-body of trehalose obtained by the method in Example A-3, 0.05 part by weight of calcium stearate, 0.5 part by weight of an enzyme-treated rutin, and 0.5 part by weight of a tea extract was heated to about 120° C. and fed to a pressure forming machine to obtain a short-rod shaped-body. Thereafter, the shaped-body was heated to about 130° C. and fed to an extruder as inflation technique to obtain a film shaped-body. The product can be arbitrarily used as a film for keeping the freshness of fresh plants and foods such as flowers, vegetables, fruits, meets, and fishes.

Example B-13

Rectangular-parallelepiped Shaped-body

One hundred and fifty parts by weight of a thermoplastic shaped-body of trehalose, obtained by the method in Example A-7, was heated to about 100° C. and mixed with 13 parts by weight of gelatine, which had been melted by heating in 18 parts by weight of water. The resulting mixture was mixed with adequate amounts of an umami seasoning, color, flavor, and an adequate amount of crystalline trehalose hydrate, then fed to an extruder and cooled to obtain a sheet shaped-body, followed by cutting into a rectangular-parallelepiped shaped-body. The product, having lumpy feel and an adequate elasticity, is a gummy candy with satisfactory flavor and taste.

Example B-14

Puffed Shaped-body

In about ½₀ volume of a large-size paper cup were placed one part by weight of pop corn and 2.0 parts by weight of a concentrated trehalose solution, prepared by boiling down a trehalose solution by heating to 150° C. or a moisture content of about 4.3% by the method in Example A-7. The contents were cooled to obtain a thermoplastic shaped-body of trehalose which enclosed pop corns in the basement of the paper cup. The product is suitably used as a pop-corn product for cooking in a microwave oven, and is a high-quality food having satisfactory stability and substantially no moisture-absorbency. After being heated to about 180° C. to puff up the corn in a microwave oven, the product was prepared into a shaped-body containing trehalose, coated with or adhered to pop corn kernels. The product having satisfactory flavor and taste can be suitably used as foods such as for snacks and refreshments.

In addition to the use of foods, the product can be used as a heat insulator, buffering material, or acoustical material because it has a lesser moisture-absorbency, satisfactory stability, and excellent heat-insulating-, buffering-, and acoustic-abilities. Unlike synthetic plastics, the product does not generate high energy when burned for disposal and does not damage incinerators, and further it is biodegradable so that it less spoils the environment.

As described above, the thermoplastic shaped-body of trehalose according to the present invention is easily handleable because of its satisfactory thermoplasticity, moisture resistance, heat resistance, acid tolerance, alkaline tolerance, and storage stability. With the thermoplasticity, the product has a characteristic of being repeatedly formed or molded.

In producing the thermoplastic shaped-body of trehalose, the processibility during its forming or molding can be advantageously improved by lowering the adhesion of trehalose solution.

By heating the thermoplastic shaped-body of trehalose to impart free-flowing ability, it can be easily formed into shaped-bodies with appropriate shapes. In the case of forming, the thermoplastic shaped-body of trehalose can be arbitrarily formed after mixing with functional substances and effective ingredients such as materials for food products, cosmetics, pharmaceuticals, agriculture, fishery, live stocks, and plastic-moldings.

The shaped-bodies thus obtained can be easily formed into products with appropriate shapes, which improves their supplemental values because trehalose stabilizes relatively-unstable functional substances and effective ingredients. In addition, the shaped-bodies Scan be processed into gradually-disintegrable, biodegradable ones, meaning that they are the products that well harmonize with the earth.

Accordingly, the present invention greatly influences on the fields of food-, cosmetic-, pharmaceutical-, agriculture-, fishery-, live stock-, plastic-, and house hold-industries.

While there has been described what is at present considered to be the preferred embodiments of the invention, it will be understood the various modifications may be made therein, and it is intended to cover in the appended claims all such modifications as fall within the true spirits and scope of the invention.

We claims:

1. A method for lowering the adhesion of a trehalose solution, comprising a step of, when concentrating the trehalose solution by heating, either heating said trehalose solution to a temperature of at least 165° C. or higher to reduce the moisture content of said trehalose solution to a level of not higher than about 2.4 w/w %, or incorporating into said trehalose solution a substance capable of lowering the adhesion of said trehalose solution, selected from the group consisting of lipids, carbohydrates, saccharides, polyalcohols, and emulsifiers.

2. The method of claim 1, wherein said substance is incorporated into said trehalose solution in an amount of less than 40 w/w% to said trehalose, on a dry solid basis.

3. The method of claim 1, wherein said trehalose solution is prepared by melting hydrous crystalline trehalose or anhydrous crystalline trehalose under heating conditions, or by concentrating an aqueous trehalose solution under heating conditions.

4. A thermoplastic shaped-body of trehalose in a fiber or cotton-like form, having a trehalose content of, 60 w/w % or higher, on a dry solid basis, obtainable by shaping a trehalose solution whose adhesion has been lowered by the method of any one of claims 1, 2 or 3.

5. A food product obtained by incorporating the thermoplastic shaped body of trehalose according to claim 4 into a food product.

* * * * *